United States Patent
Ishiguro et al.

(10) Patent No.: US 9,188,178 B2
(45) Date of Patent: Nov. 17, 2015

(54) PROTECTION CLIP FOR TORQUE RECEIVING PART AND METHOD OF FORMING ATTACHING RECESS THEREOF

(71) Applicant: AKEBONO BRAKE INDUSTRY CO., LTD., Tokyo (JP)

(72) Inventors: Isao Ishiguro, Tokyo (JP); Kazunari Wakabayashi, Tokyo (JP); Osamu Yokoyama, Tokyo (JP)

(73) Assignee: AKEBONO BRAKE INDUSTRY CO., LTD., Tokyo (JP)

( * ) Notice: Subject to any disclaimer, the term of this patent is extended or adjusted under 35 U.S.C. 154(b) by 130 days.

(21) Appl. No.: 13/686,950

(22) Filed: Nov. 28, 2012

(65) Prior Publication Data

US 2013/0133999 A1 May 30, 2013

(30) Foreign Application Priority Data

Nov. 30, 2011 (JP) .................. 2011-262755

(51) Int. Cl.
*F16D 65/40* (2006.01)
*F16D 65/00* (2006.01)
(Continued)

(52) U.S. Cl.
CPC ............... *F16D 65/005* (2013.01); *B23C 3/00* (2013.01); *F16D 65/0972* (2013.01);
(Continued)

(58) Field of Classification Search
CPC ............... F16D 65/005; F16D 65/0972; F16D 65/0978; F16D 2055/0016; F16D 2250/0092; F16D 2250/00

USPC ............... 188/73.38, 71.1, 72.1, 73.1, 73.35, 188/73.6, 73.37, 73.39, 250 A, 250 E, 219.1; 29/557, 558

See application file for complete search history.

(56) References Cited

U.S. PATENT DOCUMENTS 7,644,809 B2 * 1/2010 Cortinovis et al. ........ 188/73.38
8,132,612 B2 * 3/2012 Morais et al. .................. 164/137
(Continued)

FOREIGN PATENT DOCUMENTS

CN 1854554 A 11/2006
EP A1-1462671 9/2004
(Continued)

OTHER PUBLICATIONS

Office Action dated Dec. 18, 2014 from corresponding Japanese patent application No. 2014-015128 (with attached English-language translation).
(Continued)

Primary Examiner — Pamela Rodriguez
(74) Attorney, Agent, or Firm — Drinker Biddle & Reath LLP

(57) ABSTRACT

There is provided a protection clip for a torque receiving part. The protection clip is fitted into a concave portion of a torque receiving part of a caliper body, into which a lug part of a brake pad of a disc brake is inserted. The protection clip includes first and second separation preventing claws. The first separation preventing claw is bent from an outer periphery-side wall surface of the concave portion toward an upper attaching surface of the torque receiving part, and is configured to be fitted into one of a pair of recesses formed over an opening of the concave portion. The second separation preventing claw is bent from a lower attaching surface of the torque receiving part toward the concave portion, and is configured to be fitted into the other of the pair of recesses.

7 Claims, 9 Drawing Sheets

(51) Int. Cl.
  *B23C 3/00* (2006.01)
  *F16D 65/097* (2006.01)
  *F16D 55/22* (2006.01)
  *F16D 55/00* (2006.01)

(52) U.S. Cl.
  CPC ......... *F16D 65/0978* (2013.01); *F16D 55/22* (2013.01); *F16D 2055/0016* (2013.01); *F16D 2250/00* (2013.01); *F16D 2250/0092* (2013.01); *Y10T 409/303808* (2015.01)

(56) References Cited

U.S. PATENT DOCUMENTS

| | | | | |
|---|---|---|---|---|
| 8,205,726 | B2 * | 6/2012 | Schorn et al. | 188/73.37 |
| 2004/0188188 | A1 | 9/2004 | Barbosa et al. | |
| 2010/0147635 | A1 | 6/2010 | Hayashi | |
| 2011/0127120 | A1 * | 6/2011 | Stumpf et al. | 188/71.1 |
| 2013/0001024 | A1 * | 1/2013 | Odaira et al. | 188/72.3 |

FOREIGN PATENT DOCUMENTS

| | | |
|---|---|---|
| EP | 1709341 B1 | 10/2010 |
| FR | 2925634 A1 | 6/2009 |
| JP | H01-154340 | 10/1989 |
| JP | A-H09-229112 | 9/1997 |
| JP | 3198397 B2 | 8/2001 |
| JP | 2007-321844 A | 12/2007 |
| JP | 2010-060080 | 3/2010 |
| JP | 2010-159818 A | 7/2010 |
| WO | WO 2005/064191 A1 | 7/2005 |

OTHER PUBLICATIONS

Office Action dated Dec. 18, 2014 from corresponding Japanese patent application No. 2014-015129 (with attached English-language translation).

Office Action in corresponding Chinese application No. 201210507177.1, issued Apr. 8, 2015.

\* cited by examiner

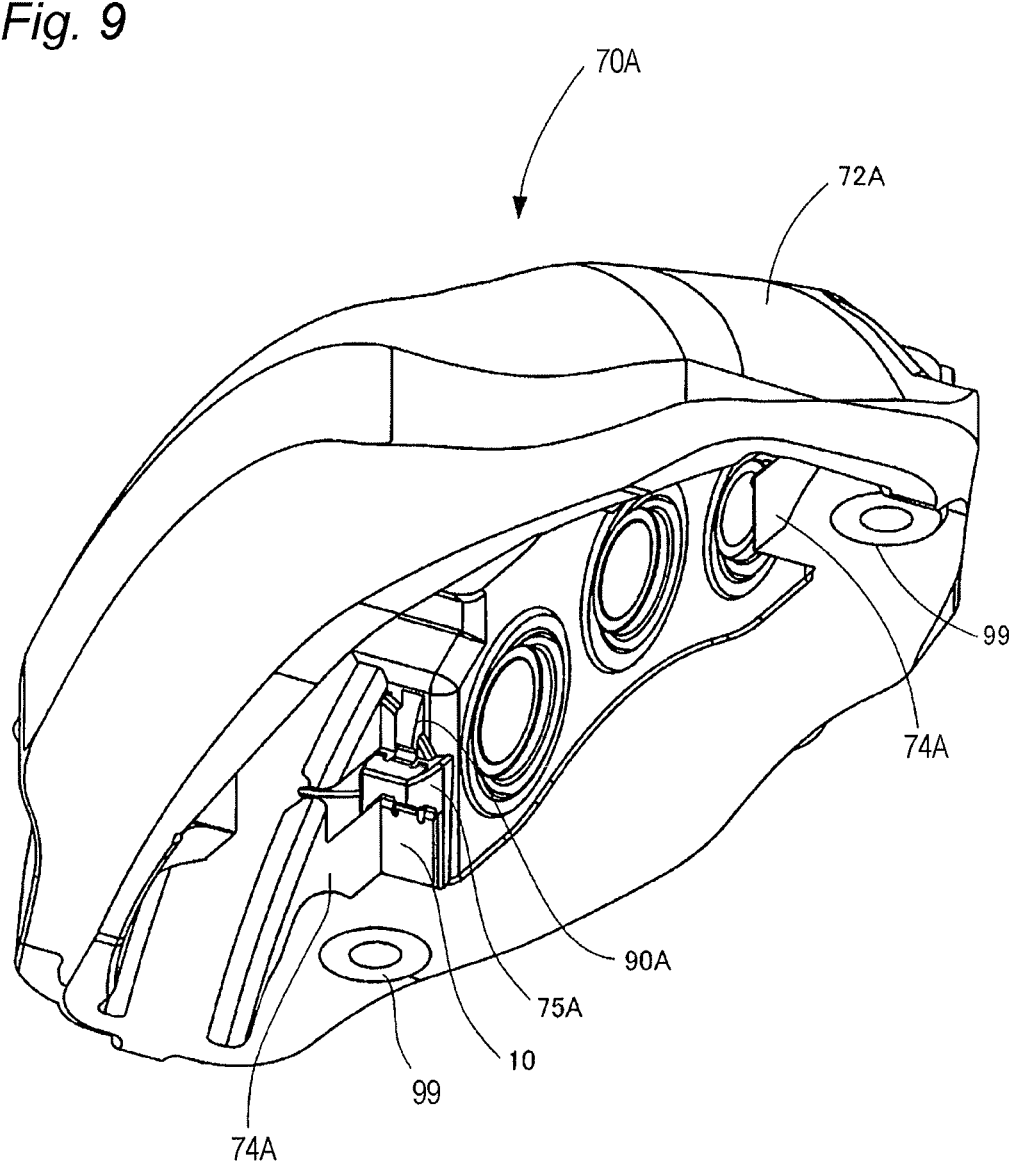

PROTECTION CLIP FOR TORQUE RECEIVING PART AND METHOD OF FORMING ATTACHING RECESS THEREOF

BACKGROUND

The invention relates to a protection clip for a torque receiving part of a caliper body consisting of a disc brake, and a method of forming an attaching recess to which the protection clip is attached.

As vehicle performance is enhanced, a vehicle weight is increased and a size of a brake rotor is increased, an area of a brake pad consisting of a disc brake is enlarged and a weight thereof is also increased. Also, performance of a tire is improved, braking torque of a brake is increased.

Accordingly, in a mechanism such as opposed type caliper in which aluminum braking torque is received by a aluminum member, it is necessary to protect the aluminum member and a contact surface of a torque receiving part of the brake pad against vibration of the brake pad and braking torque having a high acceleration by using a high strength member such as pad clip. Also, the pad clip is generally used as a guide for sliding the brake pad for generating a frictional force between a rotor and the brake pad in an axial direction of the rotor, and is used to stably hold the brake pad.

Regarding a technology of protecting the contact surface of the torque receiving part of the brake pad with the high strength member, Patent Documents 1 to 3 disclose disc brake structures.

Patent Document 1 discloses a vehicle disc brake having a pad retainer that supports a torque transfer surface of a frictional pad and guides the frictional pad in an axial direction of a disc. The pad retainer is attached to a caliper body by a screw means so that it can move in radial and axial directions of the disc.

Patent Document 2 discloses a disc brake having a retainer attached on a torque receiving surface of a caliper, which the retainer guides a brake pad in an axial direction of a disc. With the retainer, an attachment part thereof having a V-shaped section corresponding to a V-shaped section of a retainer attachment concave portion, which is formed at a central portion of the torque receiving surface in a radial direction of the disc, is fixed to the retainer attachment concave portion by a bolt.

Patent Document 3 discloses an opposed type disc brake having a liner between a torque receiving part of a caliper and a brake pad. The liner has a fixing part that is fixed to the torque receiving part, and can be fixed to an end face of the torque receiving part by being fastened with a fastening member, which is inserted into a hole of the fixing part, with predetermined torque.

[Patent Document 1] JP-B-3198397
[Patent Document 2] JP-A-2010-159818
[Patent Document 3] JP-A-2007-321844

SUMMARY

According to one aspect of the present invention, there is provided a protection clip for a torque receiving part, the protection clip being fitted into a concave portion of a torque receiving part of a caliper body, into which a lug part of a brake pad of a disc brake is inserted, the protection clip comprising:

a first separation preventing claw, bent from an outer periphery-side wall surface of the concave portion toward an upper attaching surface of the torque receiving part, and configured to be fitted into one of a pair of recesses formed over an opening of the concave portion; and a second separation preventing claw, bent from a lower attaching surface of the torque receiving part toward the concave portion, and configured to be fitted into the other of the pair of recesses.

According to another aspect of the present invention, there is provided a protection clip for a torque receiving part, comprising:

an insertion part, fitted into a concave portion of a torque receiving part of a caliper body, configured to insert a lug part of a brake pad of a disc brake thereinto, and contacting an outer periphery-side surface and an inner periphery-side wall surface of the concave portion in a radial direction of a rotor;

a pressure receiving part, bent from one end of the insertion part, and extending along a lower attaching surface of the torque receiving part;

a first separation preventing claw, bent from the other end of the insertion part contacting the outer periphery-side wall surface toward an upper attaching surface of the torque receiving part, and configured to be fitted into one of a pair of concave recesses formed over an opening of the concave portion;

a second separation preventing claw, bent from the lower attaching surface toward the concave portion, disposed between the insertion part and the pressure receiving part, and configured to be fitted into the other of the pair of concave recesses; and a clamp claw, protruding from the other end of the insertion part along the outer periphery-side wall surface.

In the protection clip, a pair of the clamp claws may be formed at positions located at the other end of the insertion part, and the first separation preventing claw may be sandwiched therebetween.

The insertion part may have a first support piece contacting the outer periphery-side wall surface, a second support piece contacting the inner periphery-side wall surface and a connection piece connecting the first support piece and the second support piece.

A relation of $\alpha < \beta < \gamma$ may be satisfied in which $\alpha$ is a length of the connection piece, $\beta$ is a length from the second support piece to a tip of the clamp claw and $\gamma$ is an opening width of the concave portion.

The first support piece may be bent to reduce a gap between the first support piece and the outer periphery-side wall surface in a state where the first support piece is inserted into the concave portion.

The first separation preventing claw may form a gap between a tip of the first separation preventing claw and a bottom surface of the one of the concave recesses.

The second separation preventing claw may form a gap between a tip of the second separation preventing claw and a bottom surface of the other of the concave recesses.

According to another aspect of the present invention, there is provided a method of forming an attaching recess to which a protection clip for a torque receiving part is attached, the method comprising:

inserting a cutter having a rotary blade in a radial direction of a rotor through an opening of a rotor-side of a caliper body;

moving the rotary blade in a circumferential direction of the rotor through an opening of a concave portion formed at a torque receiving part to form a pair of concave recesses at positions over the opening of the concave portion.

The rotary blade may be moved in the radial direction and the circumferential direction to form the concave recesses.

BRIEF DESCRIPTION OF DRAWINGS

FIG. 6A is a sectional view taken along a line A-A of FIG. 6B, and FIG. 6B is a side sectional view.

FIG. 7A compares the concave portion and the insertion part, and FIG. 7B is a partially enlarged view of a first support piece.

FIG. 8A is a side sectional view showing a state where a brake pad is attached, and FIG. 8B is a perspective view in which the brake pad is omitted.

FIG. 9 is a perspective view of a disc brake of a first modified embodiment to which the protection clip for the torque receiving part according to an embodiment of the invention is attached.

FIG. 10A is a side sectional view showing a state where a brake pad is attached and FIG. 10B is a side sectional view of a caliper body.

DETAILED DESCRIPTION OF EXEMPLIFIED EMBODIMENTS

According to the structures in which the high strength member is attached by the fastening means such as screw, as disclosed in Patent Documents 1 to 3, it is necessary to form a female hole in the torque receiving part. Also, the fastening bolt should be screw-engaged at a narrow place, which causes a problem regarding the assembling. In particular, in the structure where the high strength member is attached in the axial direction of the rotor, the female screw for fixing is at a narrow place, so that the processing thereof is very difficult. Also, when a shape of a pad clip of the torque receiving part is different at inner and outer sides of the rotor, the pad clip should be processed to have dedicated shapes, respectively. Like this, the configuration where the high strength member is attached to the torque receiving part by the fastening means increases the number of parts and the number of manufacturing processes.

In addition to the assembling of the high strength member by the fastening means, there is also a high strength member that can be assembled to the torque receiving part with a clamp type, i.e., a holding means by a spring force. For the clamp type, since the holding force is smaller, compared to the fastening means, the high strength member rattles in the axial direction of the rotor. Also, considering the assembling ability, it is necessary to set a slight gap between the high strength member and the caliper body. Also, for the clamp type, the high strength member is apt to be worn or damaged due to the vibration of the brake pad, compared to the fastening means.

Accordingly, the invention has been made to solve the above problems. An object of the invention is to provide a protection clip for a torque receiving part capable of being easily mounted and holding an assembled posture and a method of forming an attaching recess thereof.

An embodiment of a protection clip for a torque receiving part and a method of forming an attaching recess thereof will be specifically described with reference to the accompanying drawings.

Figure 1:
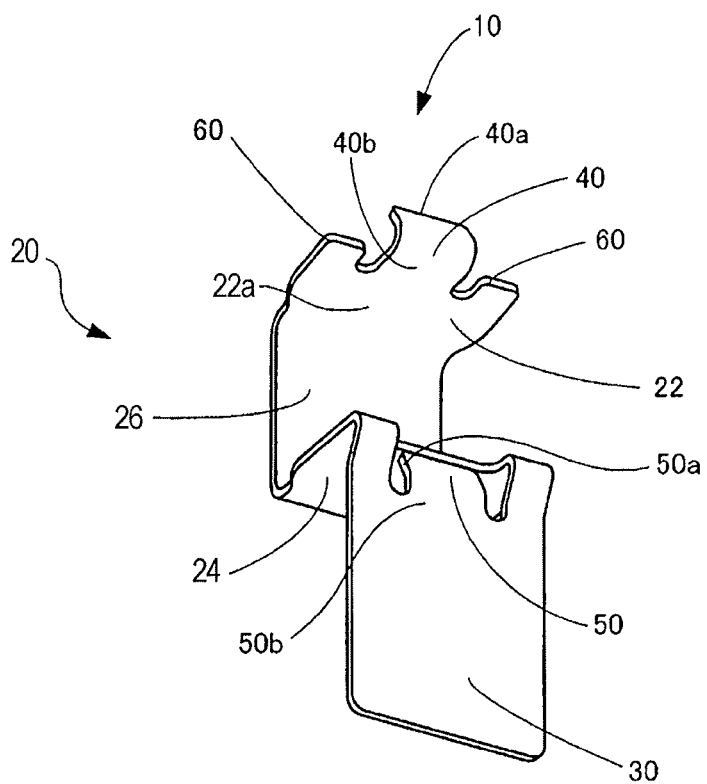
FIG. 1 is a perspective view of a protection clip for a torque receiving part according to an embodiment of the invention, which is seen from the lower of a pressure receiving part thereof.
Figure 2:
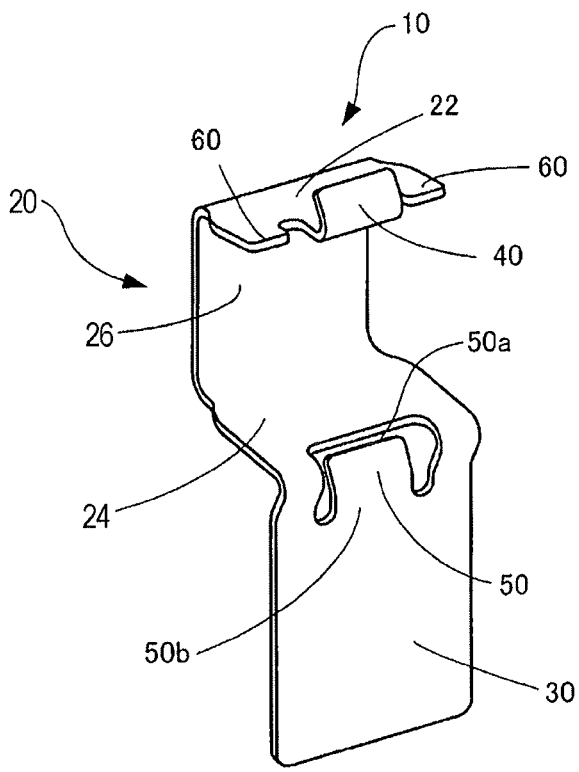
FIG. 2 is a perspective view of the protection clip for the torque receiving part according to an embodiment of the invention, which is seen from the upper of a insertion part thereof.
Figure 3:
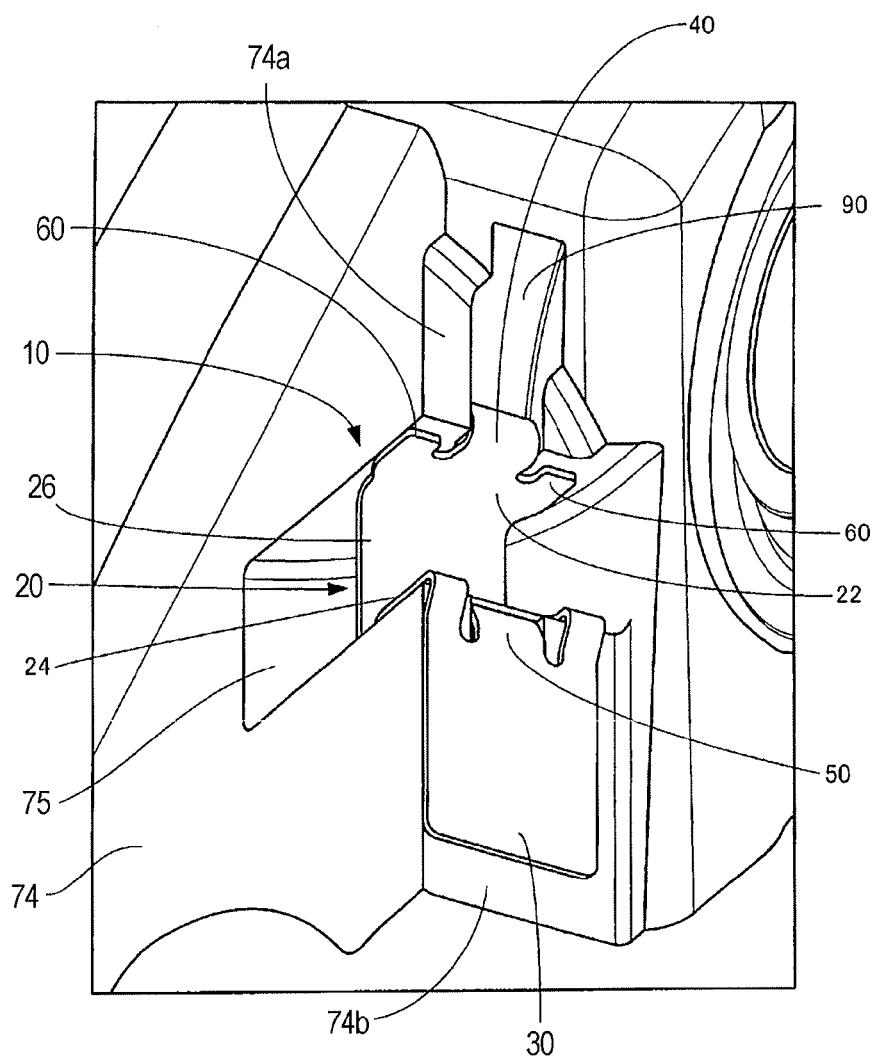
FIG. 3 is a perspective view showing an assembled state of the protection clip for the torque receiving part according to an embodiment of the invention.
Figure 4:
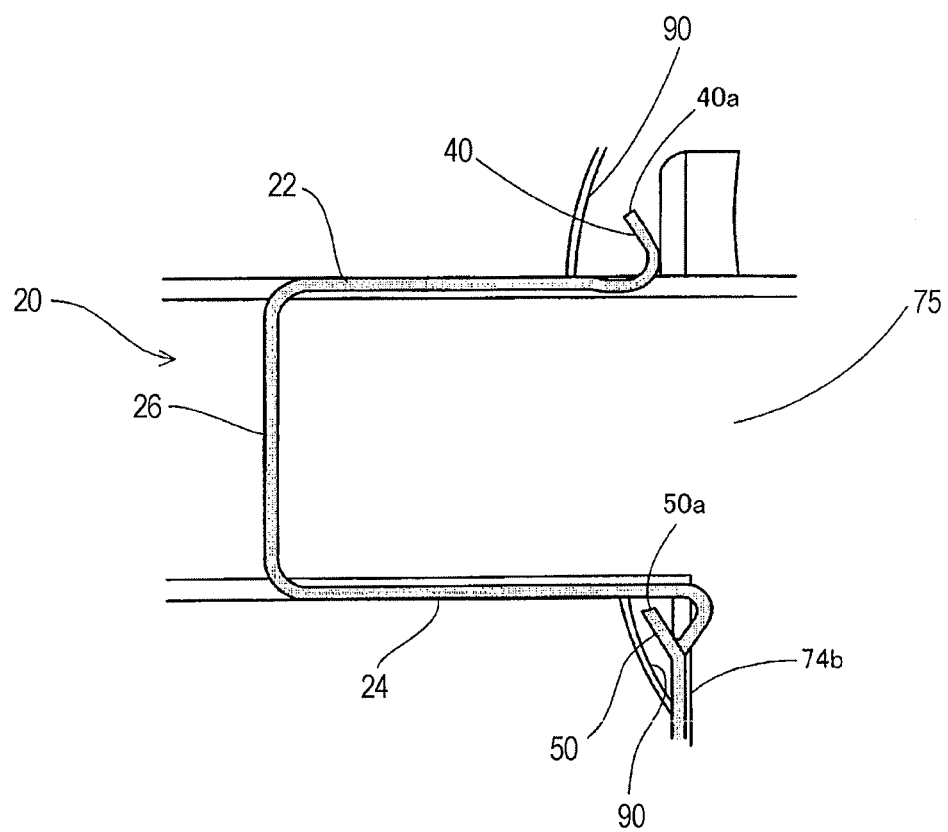
FIG. 4 is a partially enlarged side view of the insertion part of the protection clip for the torque receiving part.

FIG. 1 is a perspective view of a protection clip for a torque receiving part according to an embodiment of the invention, which is seen from the lower of a pressure receiving part thereof. FIG. 2 is a perspective view of the protection clip for the torque receiving part according to an embodiment of the invention, which is seen from the upper of a insertion part thereof. FIG. 3 is a perspective view showing an assembled state of the protection clip for the torque receiving part according to an embodiment of the invention. FIG. 4 is a partially enlarged side view of the insertion part of the protection clip for the torque receiving part.

Figure 5:
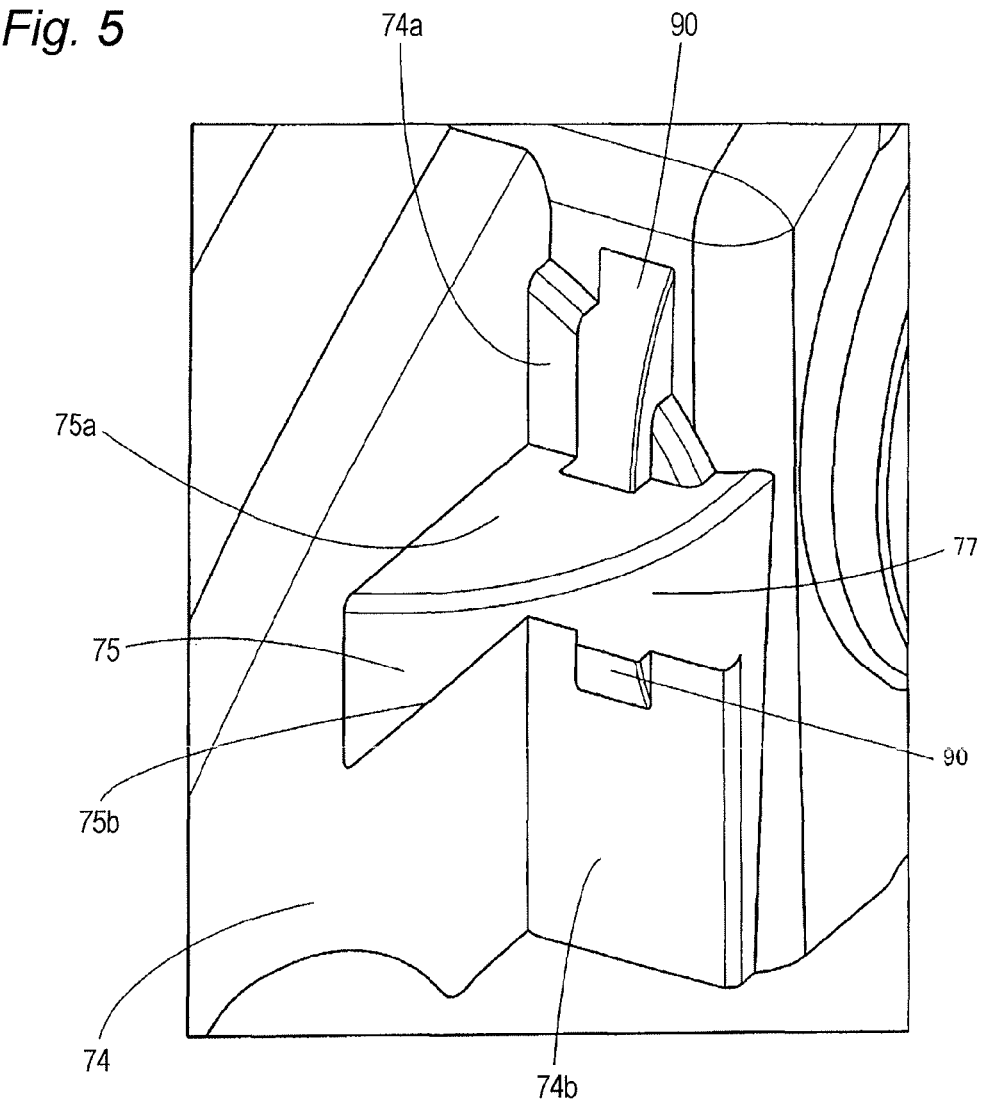
FIG. 5 is a perspective view of a concave portion of the torque receiving part.
Figure 8A:
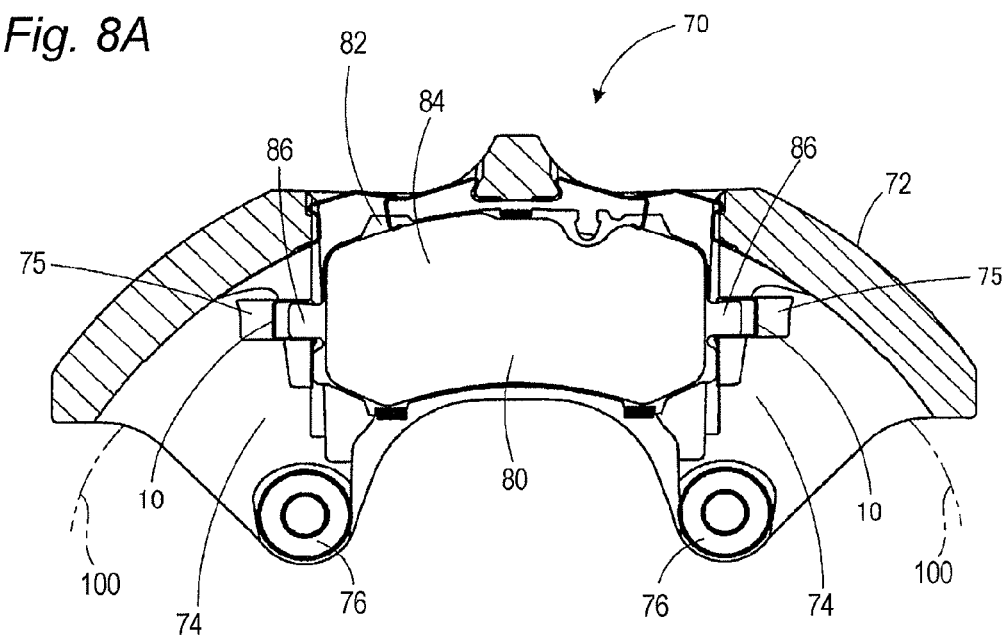
FIGS. 8A and 8B illustrate a disc brake to which the protection clip for the torque receiving part according to an embodiment of the invention is attached.
Figure 8B:
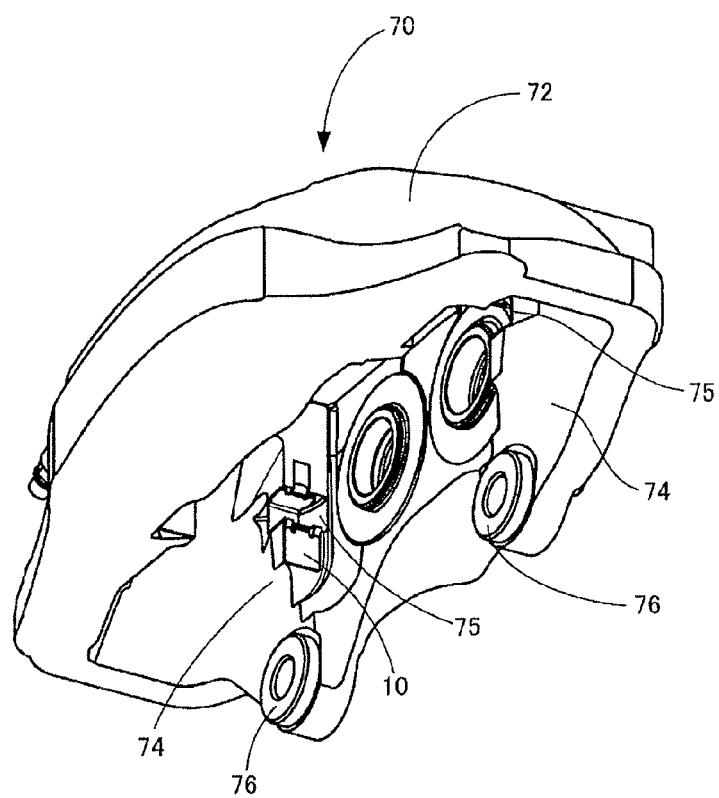

First, a disc brake 70 to which a protection clip for a torque receiving part of the invention is attached is described. FIGS. 8A and 8B illustrate a disc brake to which a protection clip for a torque receiving part according to an embodiment of the invention is attached. FIG. 8A is a side sectional view showing a state where a brake pad is attached and FIG. 8B is a perspective view in which the brake pad is omitted. FIG. 5 is a perspective view of a concave portion of the torque receiving part.

As shown in FIGS. 8A and 8B, the disc brake 70 has a caliper body 72, a brake pad 80 and a protection clip 10 of a torque receiving part.

The caliper body 72 supports the brake pad 80 and the protection clip 10 for the torque receiving part. The caliper body 72 has torque receiving parts 74, which are respectively arranged at a rotation input side and a rotation output side of a rotor 100 over the rotor 100 and attaching holes 76 for fixing the torque receiving parts 74 to a support member (not shown).

The torque receiving part 74 to which the protection clip 10 of this embodiment is attached has a concave portion 75. The concave portion 75 serves as a support portion for supporting the brake pad 80 that will be described later. Also, the concave portion 75 of this embodiment has concave recesses 90. The concave recesses 90 have an arc shape on an opening 77 between an upper attaching surface 74a and a lower attaching surface 74b of the concave portion 75 and over a radial direction of the rotor 100, i.e., on the upper attaching surface 74a and the lower attaching surface 74b of the torque receiving part 74 and over a direction orthogonal to a sliding direction of the brake pad 80. In the meantime, the lower attaching surface 74b is a pressure receiving surface when braking torque is applied.

Figure 6A:
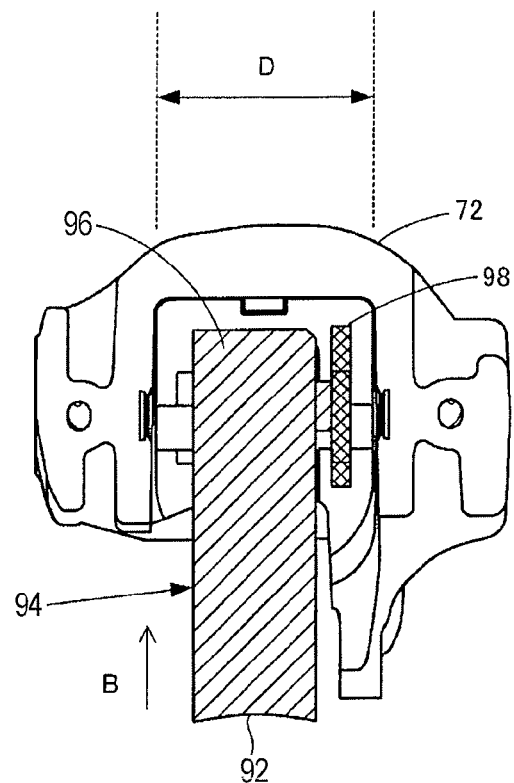
FIGS. 6A and 6B illustrate a method of forming a concave recess of a concave portion of the torque receiving part.
Figure 6B:
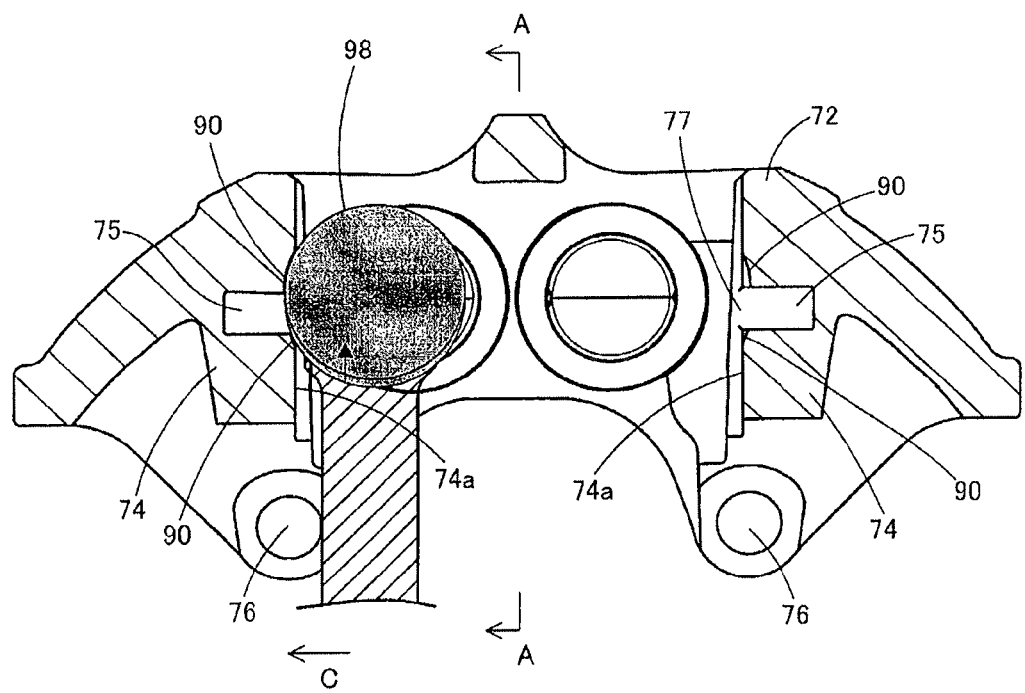

FIGS. 6A and 6B illustrate a method of forming a concave recess of a concave portion of the torque receiving part 74. FIG. 6A is a sectional view taken along a line A-A of FIG. 6B and FIG. 6B is a side sectional view. As shown, the concave recesses 90 are formed using a cutting jig 92 that is the cutting means. The cutting jig 92 is configured so that a rotary blade 98 is rotatably attached to a blade support part 96 formed at a tip of a main body 94. In the main body 94, a plurality of gears (not shown) is connected in a longitudinal direction. The rotary blade 98 of the blade support part 96 is detachably supported, so that it is possible to attach the rotary blade 98 having an arbitrary cutting width. In the meantime, regarding the cutting jig 92, a jig having a width smaller than an opening width D of the caliper body 72 is used.

The cutting jig 92 is inserted through an opening of a rotor side (inner side) of the caliper body 72 in a radial direction of the rotor shown as an arrow B. At this time, as shown in FIG. 6A, since the blade support part 96 and the rotary blade 98 have widths smaller than the opening width D of the caliper body 72, it is possible to easily insert the cutting jig up to the concave portion 75. Then, as shown in FIG. 6B, the rotary blade 98 is moved in a depth direction of the concave portion 75 through the opening 77 between the upper attaching surface 74a and the lower attaching surface 74b of the concave portion 75. The depth direction of the concave portion 75 is a circumferential direction of the rotor shown as an arrow C. The rotary blade 98 may be moved in the radial direction with being moved in the circumferential direction. A thickness of the rotary blade 98 is set to have a width of the concave recess 90, so that the concave recess 90 can be easily formed. Like this, it is possible to form the arc-shaped concave recesses 90 over the opening 77 between the upper attaching surface 74a and the lower attaching surface 74b of the concave portion 75 just by moving the rotary blade 98 of the cutting jig 92 in the depth direction of the concave portion 75. As a result, it is possible to improve the productivity while suppressing the processing time and the processing cost.

Meanwhile, in the drawings, the cutting jig 92 has a configuration where one rotary blade 98 is attached to the main body. However, a cutting jig having two rotary blades of one rotary blade attached to the main body and the other rotary blade attached to a backside of the main body may be used. In other words, two rotary blades arranged at positions sandwiching a gear of the main body therebetween may be used. By this type of cutting jig, it is possible to collectively form the concave recesses 90 at the inner and outer sides of the rotor in one forming process or to form the concave recesses with slight movement, thereby remarkably reducing the processing time.

The brake pad 80 has a pressure plate 82 made of metal and a lining 84 causing a frictional force between the rotor 100 and the lining. The brake pad 80 is arranged between the torque receiving parts 74 disposed at the inner and outer sides of the rotor 100 with the lining 84 being opposed thereto and provided at the rotation input side and the rotation output side of the rotor 100. The pressure plate 82 is formed with a convex part that is referred to as an lug part 86. When the lug part 86 is inserted into the concave portion 75 of the torque receiving part 74, it is held by the protection clip 10 that will be described later.

As shown in FIG. 1, the protection clip 10 for the torque receiving part according to an embodiment of the invention has a insertion part 20 that is fitted into the concave portion 75 of the torque receiving part 74 of the caliper body 72, into which the lug part 86 of the brake pad 80 of the disc brake 70 is inserted, and contacts outer and inner periphery-side opposed wall faces 75a, 75b of the concave portion 75 in the radial direction of the rotor, a pressure receiving part 30 that is bent from one end of the insertion part 20 and extends along the lower attaching surface 74b of the torque receiving part 74, a first separation preventing claw 40 that is bent from the other end of the insertion part 20 contacting the outer periphery-side wall surface 75a toward the upper attaching surface 74a of the torque receiving part 74 and is fitted into one of the pair of concave recesses 90 formed over the opening 77 between the upper attaching surface 74a and lower attaching surface 74b of the concave portion 75, a second separation preventing claw 50 that is bent from the lower attaching surface 74b toward the concave portion 75 between the insertion part 20 and the pressure receiving part 30 and is fitted to the other of the pair of concave recesses 90 and clamp claws 60 that protrude from the other end of the insertion part 20 along the outer periphery-side wall surface 75a of the concave portion 75. Also, in this embodiment, the protection clip 10 can be integrally formed by press working a rustproof metal plate having high strength such as stainless steel. Also, a width of the protection clip 10 is set to be the substantially same as those of the upper attaching surface 74a and lower attaching surface 74b of the torque receiving part 74.

The insertion part 20 is a member that is fitted into the concave portion 75 of the torque receiving part 74. When attached to the concave portion 75 of the torque receiving part 74, the insertion part 20 supports the lug part 86 of the brake pad 80 and helps the sliding of the brake pad 80 in the axial direction of the rotor. The insertion part 20 has a first support piece 22 that contacts the outer periphery-side wall surface 75a, a second support piece 24 that contacts the inner periphery-side wall surface 75b and a connection piece 26 that connects the first support piece 22 and the second support piece 24, and has a substantially U-shaped section. The first support piece 22 is a member that contacts the outer periphery-side wall surface 75a of the concave portion 75. The second support piece is a member that contacts the inner periphery-side wall surface 75b of the concave portion 75. The connection piece 26 has a length that is slightly smaller than the opening width of the concave portion 75, i.e., the radial length of the rotor. By the connection piece 26, it is possible to reduce a gap between the insertion part 20 and the concave portion 75.

Figure 7A:
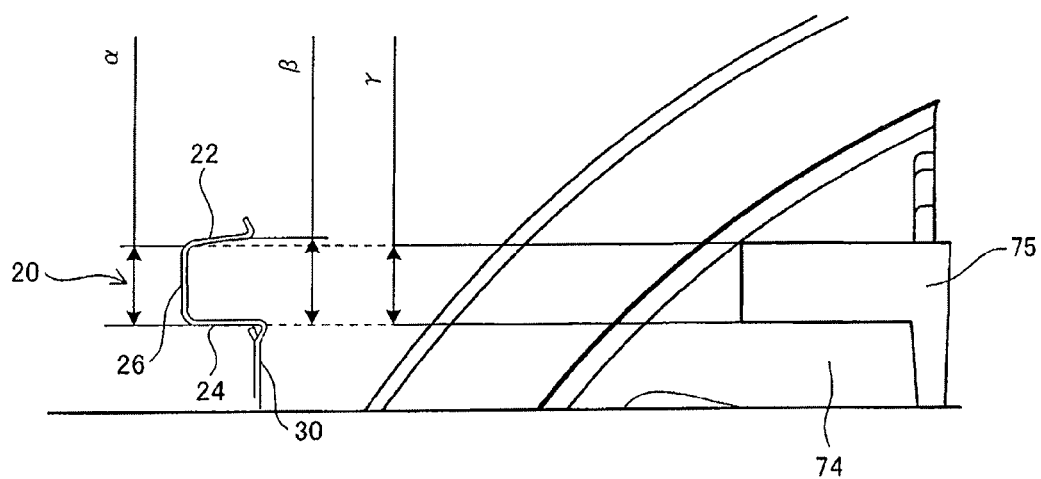
FIGS. 7A and 7B illustrate a bending setting range of the insertion part.
Figure 7B:
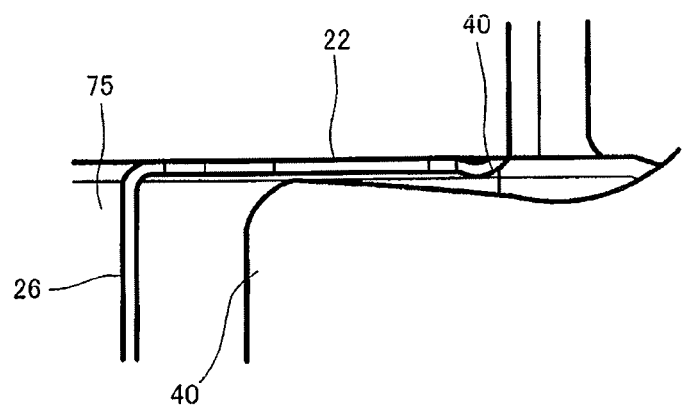

The second support piece 24 and the connection piece 26 of the insertion part 20 are bent at a substantial right angle therebetween. The first support piece 22 and the connection piece 26 are bent at a predetermined inclined angle. FIGS. 7A and 7B illustrate a bending setting range of the insertion part 20. FIG. 7A compares the concave portion and the insertion part 20 and FIG. 7B is a partially enlarged view of the first support piece 22. As shown, when the second support piece 24 of the insertion part 20 is matched with the lower surface of the concave portion 75 of the torque receiving part 74, a relation of $\alpha<\beta<\gamma$ is satisfied in which $\alpha$ is a length of the connection piece 26. The $\alpha$ is a length of end portions of the connection piece 26 between the bent parts, the $\beta$ is a length from the second support piece 24 to a tip of the clamp claw 60, and the $\gamma$ is the opening width of the concave portion 75. Also, when inserted into the concave portion 75, the first support piece 22 is bent to reduce a gap between the first support piece and the outer periphery-side wall surface 75a of the concave portion 75. Also, the first support piece 22 is formed at an opposite side to the opposing second support piece 24 so that it has a shape bent like a bow. By setting the above range, an elastic support force, which is applied in a widening direction toward both sides, is generated between the first support piece 22 and the second support piece 24, so that it is possible to stably support the first support piece and the second support piece with being widened. Thereby, it is possible to stably secure the assembling ability between the first and second support pieces 22, 24 and the opposing outer periphery-side and inner periphery-side wall surfaces 75a, 75b of the concave portion 75. Also, since the first support piece 22 is formed at an opposite side to the opposing second support piece 24 so that it has a shape bent like a bow, it is possible to uniformly apply a transverse pressure to the outer periphery-side wall surface 75a of the concave portion 75. Therefore, it is possible to arrange the first support piece 22 along the outer periphery-side wall surface 75a of the concave portion 75 and thus to remarkably reduce the gap (clearance) between the first support piece 22 and the outer periphery-side wall surface 75a. Hence, it is possible to prevent the damage of the clip even when the vibration is caused for the brake pad 80, thereby considerably improving the durability of the protection clip 10.

The pressure receiving part 30 is a planer plate that extends from an end portion of the second support piece 24 of the insertion part 20 along the lower attaching surface 74b of the torque receiving part 74. Specifically, the pressure receiving part 30 is bent from an end portion of the second support piece 24 at an acute angle and then again bent at an obtuse angle and is thus made to extend along the lower attaching surface 74b. The bent part between the second support piece 24 and the pressure receiving part 30 is formed to protrude toward an arrangement direction of the brake pad 80. Thereby, the bent part between the second support piece 24 and the pressure receiving part 30 does not contact a corner part of the opening 77 between the upper attaching surface 74a and lower attaching surface 74b of the concave portion 75 at a state where the protection clip has been assembled. Therefore, it is possible to prevent the non-uniformity of the assembling ability, which is caused due to a size tolerance, when assembling the protection clip 10.

A free end 22a of the first support piece 22 is formed with the first separation preventing claw 40 and the clamp claws 60.

The first separation preventing claw 40 is a member that is bent from a tip of the insertion part 20 contacting the wall surface toward the upper attaching surface 74a of the torque receiving part 74 and is fitted into one of the pair of concave recesses 90 formed over the opening 77 between the upper attaching surface 74a and lower attaching surface 74b of the concave portion 75. A fixed end 40b of the first separation preventing claw 40 is formed at a central portion of the free end 22a of the first support piece 22. A free end 40a of the first separation preventing claw 40 has a hook shape that is bent toward an opposite direction to the second support piece 24. Also, a width of the first separation preventing claw 40 is the substantially same as or slightly smaller than that of the concave recess 90 and forms a slight gap in the axial direction of the rotor. FIG. 4 is a partially enlarged side view of the insertion part of the protection clip for the torque receiving part. As shown, when the braking torque is not applied, the first separation preventing claw 40 forms a gap between a tip of the first separation preventing claw 40 and the concave recess 90, thereby preventing the tip from contacting the concave recess 90. By this configuration, the tip (the free end 40a) of the first separation preventing claw 40 does not contact the concave recess 90 at a state where the protection clip has been assembled to the concave portion 75 of the torque receiving part 74. Therefore, it is possible to prevent the non-uniformity of the assembling ability, which is caused due to the size tolerance, when assembling the protection clip 10.

The clamp claw 60 is a member that protrudes from the tip of the first separation preventing claw 40 of the insertion part 20 along the outer periphery-side wall surface 75a of the concave portion 75. A pair of the clamp claws 60 is formed at positions of the free end 22a of the first support piece 22 sandwiching the first separation preventing claw 40 at a center. Like this, the pair of clamp claws 60 is formed at both corners of the free end 22a of the first support piece 22. Thereby, even when the brake pad 80 is moved in the sliding direction or the vibration is caused for the brake pad 80, it is possible to stabilize the posture of the protection clip 10. Also, it is possible to keep the assembling ability of the protection clip 10 for a long time.

The bent part between the pressure receiving part 30 and the second support piece 24 is formed with the second separation preventing claw 50.

The second separation preventing claw 50 is a member that is bent from the lower attaching surface 74b toward the concave portion 75 between the insertion part 20 and the pressure receiving part 30 and is fitted into the other of the pair of the concave recesses 90. A fixed end 50b of the second separation preventing claw 50 is formed at a side of the pressure receiving part 30 connecting with the second support piece 24. A free end 50a of the second separation preventing claw 50 has a hook shape that is bent toward the bent location of the pressure receiving part 30 and the second support piece 24. Also, a width of the second separation preventing claw 50 is the substantially same as or slightly smaller than that of the concave recess 90 and forms a slight gap in the axial direction of the rotor. As shown in FIG. 4, when the braking torque is not applied, the second separation preventing claw 50 forms a gap between a tip of the claw and the concave recess 90, thereby preventing the tip from contacting the concave recess 90. By this configuration, the tip (the free end 50a) of the second separation preventing claw 50 does not contact the concave recess 90 at a state where the protection clip 10 has been assembled. Therefore, it is possible to prevent the non-uniformity of the assembling ability, which is caused due to the size tolerance, when assembling the protection clip 10.

Also, the first and second separation preventing claws 40, 50 are respectively fitted into the respective concave recesses 90 formed over the opening 77 between the upper attaching surface 74a and lower attaching surface 74b of the concave portion 75. Therefore, side surfaces of the claws are brought into contact with side surfaces of the concave recesses 90 upon the braking, so that the protection clip 10 is not separated. Hence, it is possible to keep the assembled state of the protection clip 10 for a long time.

With the protection clip 10 for the torque receiving part having the above configuration, the insertion part 20 is inserted in the circumferential direction of the rotor along the outer periphery-side and inner periphery-side wall surfaces 75a, 75b of the concave portion 75 through the opening 77 between the upper attaching surface 74a and lower attaching surface 74b of the concave portion 75, upon the assembling. The opening 77 between the upper attaching surface 74a and lower attaching surface 74b of the concave portion 75 is beforehand formed at positions over the opening 77 with the concave recesses 90 in the radial direction of the rotor. The insertion part is inserted and aligned until the first and second separation preventing claws 40, 50 are fitted into the concave recesses 90. In a state where the protection clip 10 is fitted into the concave portion 75, the first separation preventing claw 40 forms the gap between the tip of first separation preventing claw 40 and the concave recesses 90, and the second separation preventing claw 50 forms the gap between the tip of second separation preventing claw 50 and the concave recesses 90, thereby preventing the tips from contacting the concave recesses 90. The first support piece 22 of the insertion part 20 is configured to satisfy the relation of $\alpha < \beta < \gamma$ in which $\alpha$ is the length of the connection piece 26 (the length of end portions of the connection piece 26 between the bent parts), $\beta$ is the length from the second support piece 24 to the tip of the clamp claw 60 and $\gamma$ is the opening width of the concave portion 75. Also, when inserted into the concave portion 75, the first support piece 22 is bent to reduce the gap between the first support piece and the outer periphery-side wall surface 75a of the concave portion 75.

According to the protection clip 10, it is possible to easily assemble the protection clip to the concave portion 75 by the fitting structure of the insertion part 20, the concave portion 75, the clamp claws 60 and the concave recesses 90. The first and second separation preventing claws 40, 50 are respectively fitted into the respective concave recesses 90 formed over the opening 77 between the upper attaching surface 74a and lower attaching surface 74b of the concave portion 75. Therefore, it is possible to easily perform the alignment. Also, the side surfaces of the claws are brought into contact with the side surfaces of the concave recesses 90 upon the braking, so that the protection clip 10 is not separated. Hence, it is possible to keep the assembled state of the protection clip for a long time. In particular, for an opposed type disc brake, it is difficult to provide a clamp type pad clip to a torque receiving part due to the layout, and it is efficient to form a gap between a concave recess and a separation preventing claw and thus to loosely fit the separation preventing claw into the concave recess.

Figure 10A:
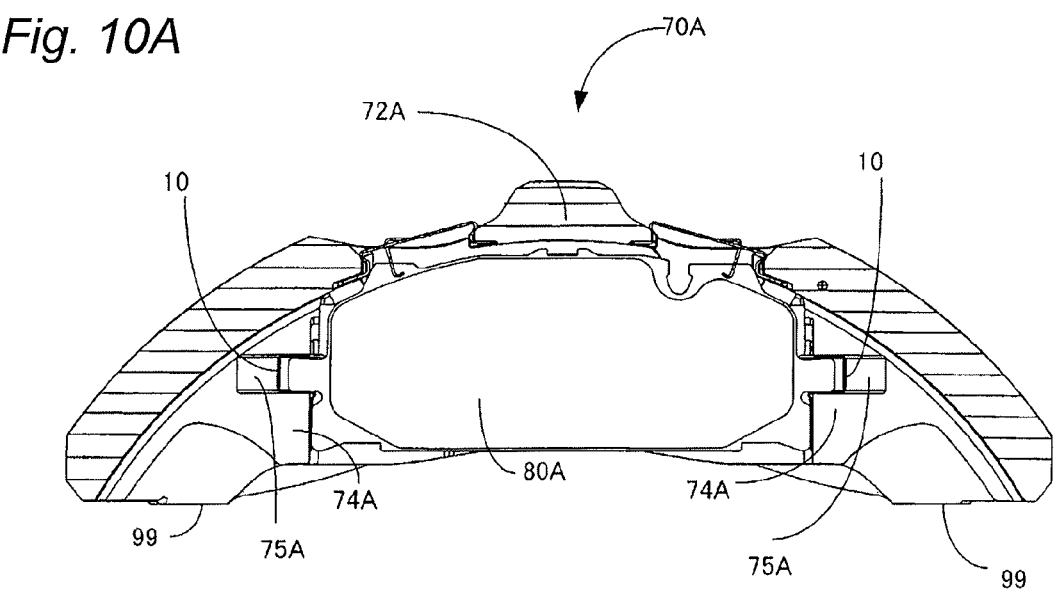
FIGS. 10A and 10B illustrate the disc brake of the first modified embodiment.
Figure 10B:
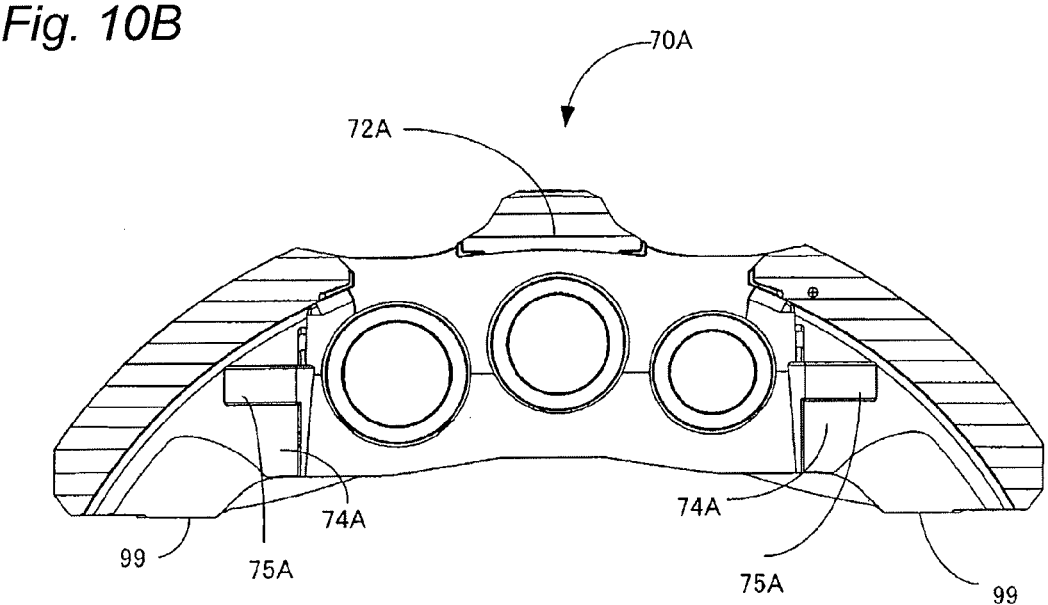

FIG. 9 is a perspective view of a disc brake of a first modified embodiment to which the protection clip 10 for the torque receiving part according to an embodiment of the invention is attached. FIGS. 10A and 10B illustrate a disc brake 70A of the first modified embodiment. FIG. 10A is a side sectional view showing a state where a brake pad is attached and FIG. 10B is a side sectional view of a caliper body. As shown, the disc brake 70A of the first modified embodiment has a configuration that can attach a support (not shown), which has the caliper body 72A, a brake pad 80A and the protection clip 10 for the torque receiving part and also has an attaching hole for fixing to a support member (not shown), to attaching holes 99 of lower surfaces of torque receiving parts 74A. The disc brake 70A of the first modified embodiment has a configuration where an opening of the caliper body 72A is narrowed at the support, compared to the disc brake 70 shown in FIGS. 8A and 8B. Nevertheless, it is possible to insert the cutting jig and to easily form concave recesses 90A. Also, it is possible to easily attach the protection clip 10 to the concave recesses 75A and to thus obtain the same operational effects.

According to the above configuration, the separation preventing claws are fitted and fixed to transverse walls of the concave recesses by the first and second separation preventing claws fitted in the concave recesses, so that the clip is not deviated in an axial direction. Therefore, it is possible to prevent the clip from rattling.

According to the above configuration, the clip can be easily assembled to the concave portion by the insertion part and the clamp claw. The first and second separation preventing claws are respectively fitted into the respective concave recesses formed over the opening of the concave portion. Therefore, side surfaces of the claws are brought into contact with side surfaces of the concave recesses upon the braking, so that the protection clip is not separated. Hence, it is possible to keep the assembled state of the protection clip for a long time.

According to the above configuration, it is possible to support a base of the first separation preventing claw fitted in the concave recess along the outer periphery-side wall surface of the concave portion from both sides, thereby stabilizing the assembled posture of the protection clip.

According to the above configuration, it is possible to arrange the first support piece along the outer periphery-side wall surface of the concave portion and thus to remarkably reduce a gap (clearance) between the first support piece and the outer periphery-side wall surface. Hence, it is possible to prevent the damage of the protection clip even when vibration is caused for a brake pad, thereby considerably improving the durability of the protection clip.

When assembling the protection clip, the claw tip may or may not abut on a bottom surface of the concave recess in a configuration wherein the claw tip contacts a bottom surface of the concave recess. As a result, the assembling ability may be unstable. However, according to the above configuration, the tips of the first and second separation preventing claws do not contact the bottom surfaces of the concave recesses at a state where the protection clip has been assembled to the concave portion of the torque receiving part, irrespective of non-uniformity of a size tolerance. Therefore, it is possible to prevent the non-uniformity of the assembling ability, which is caused due to the size tolerance.

According to the above configuration, it is possible to form the concave recesses over the opening of the concave portion just by moving the rotary blade of the cutting jig in a depth direction of the concave portion (in a circumferential direction of the rotor). Hence, it is possible to improve the productivity while suppressing the processing time and the processing cost.

Thereby, it is possible to gently form a curved surface of the concave recess in a vertical direction. Accordingly, the deep processing in the depth direction of the recess is not required.

According to the protection clip for the torque receiving part and the method of forming the attaching recess thereof, it is possible to easily attach the protection clip and to stabilize and keep the assembled state for a ling time.

Also, since it is not necessary to fix the protection clip on the torque receiving surface by using a fastening means, it is possible to suppress the increase in the processing processes and the processing cost. Since the protection clip can be integrally formed by the press working, it is possible to simplify the manufacturing process.

Although the invention has been specifically described with reference to the specific embodiments, it is obvious to one skilled in the art that a variety of changed and modifications can be made without departing from the spirit and scope of the invention.

This application is based on Japanese Patent Application No. 2011-262755 filed on Nov. 30, 2011, the disclosures of which are incorporated herein by way of reference.

What is claimed is:

1. A protection clip for a torque receiving part, the protection clip being fitted into a concave portion of the torque receiving part of a caliper body, into which a lug part of a brake pad of a disc brake is inserted, the protection clip comprising:
    a first separation preventing claw configured to be disposed at one end part of the concave portion, and configured to be fitted into one of a pair of recesses formed over an opening of the concave portion; and
    a second separation preventing claw configured to be disposed at the other end part of the concave portion, and configured to be fitted into the other of the pair of recesses.

2. A protection clip for a torque receiving part, comprising:
    an insertion part, fitted into a concave portion of the torque receiving part of a caliper body, configured to insert a lug part of a brake pad of a disc brake thereinto, and contacting an outer periphery-side surface and an inner periphery-side wall surface of the concave portion in a radial direction of a rotor;
    a pressure receiving part, bent from one end of the insertion part, and extending along a lower attaching surface of the torque receiving part;

a first separation preventing claw disposed at one end part of the insertion part, and configured to be fitted into one of a pair of concave recesses formed over an opening of the concave portion;

a second separation preventing claw disposed at the other end part of the insertion part and between the insertion part and the pressure receiving part, and configured to be fitted into the other of the pair of concave recesses; and a clamp claw, protruding from the other end of the insertion part along the outer periphery-side wall surface.

3. The protection clip according to claim 2, wherein a pair of the clamp claws are formed at positions located at the other end of the insertion part, and the first separation preventing claw is sandwiched therebetween.

4. The protection clip according to claim 2, wherein the insertion part has a first support piece contacting the outer periphery-side wall surface, a second support piece contacting the inner periphery-side wall surface and a connection piece connecting the first support piece and the second support piece, wherein a relation of $\alpha<\beta<\gamma$ is satisfied in which $\alpha$ is a length of the connection piece, $\beta$ is a length from the second support piece to a tip of the clamp claw and $\gamma$ is an opening width of the concave portion, and wherein the first support piece is bent to reduce a gap between the first support piece and the outer periphery-side wall surface in a state where the first support piece is inserted into the concave portion.

5. The protection clip according to claim 2, wherein the first separation preventing claw forms a gap between a tip of the first separation preventing claw and a bottom surface of the one of the concave recesses, and the second separation preventing claw forms a gap between a tip of the second separation preventing claw and a bottom surface of the other of the concave recesses.

6. A method of forming an attaching recess to which a protection clip for a torque receiving part is attached, the method comprising:

inserting a cutter having a rotary blade in a radial direction of a rotor through an opening of a rotor-side of a caliper body;

rotating the rotary blade in a circumferential direction of the rotor; and moving the rotary blade in a circumferential direction of the rotor through an opening of a concave portion formed at a torque receiving part to form a pair of concave recesses extending in the radial direction at positions over the opening of the concave portion.

7. The method according to claim 6, wherein the rotary blade is moved in the radial direction and the circumferential direction to form the concave recesses.

* * * * *